United States Patent [19]

Shepherd

[11] 4,445,612

[45] May 1, 1984

[54] SELF-LOCKING BOX FOR TAPE CASSETTES AND INFORMATION FLAP

[76] Inventor: Warren R. Shepherd, 4310 Greenbush Ave., Sherman Oaks, Calif. 91423

[21] Appl. No.: 370,787

[22] Filed: Apr. 22, 1982

Related U.S. Application Data

[63] Continuation-in-part of Ser. No. 168,763, Jul. 11, 1980, abandoned.

[51] Int. Cl.³ .................. B65D 5/72; B65D 5/50; B65D 25/10; B65D 85/67
[52] U.S. Cl. .................. 206/387; 206/232; 206/45.14; 206/459; 229/44 R
[58] Field of Search ............ 206/45.14, 387, 232, 206/459; 229/44 R

[56] References Cited

U.S. PATENT DOCUMENTS

| | | | |
|---|---|---|---|
| 2,672,273 | 3/1954 | Smith | 206/232 |
| 2,980,240 | 4/1961 | Amatel | 206/45.14 |
| 2,984,401 | 5/1961 | Herkender | 229/44 R |
| 3,990,574 | 11/1976 | Roccaforte | 206/387 |
| 4,170,205 | 10/1979 | Kuehl et al. | 206/45.34 |

*Primary Examiner*—William T. Dixson, Jr.
*Attorney, Agent, or Firm*—Robert B. Block; Lewis Anten

[57] ABSTRACT

A self-locking tape cassette tape box formed from a single sheet of stock such as cardboard or plastic, folded into a closed container having an opening for sliding a cassette tape cartridge therein and for releasably locking a discontinuity of the cartridge so as to prevent the same from sliding out of the box. The box includes locking means which abuttingly engages the discontinuity to lock the cassette in the box once fully inserted home and further includes release means for disengaging the locking means from the discontinuity. The locking release means comprise at least one internal flap joined to a front or rear wall of the box and extending inwardly and downwardly towards the bottom of the box. The release means is operable by squeezing together the two side panels of the box to cause the flaps to flex in compression and move away from engagement with the discontinuity. An information flap is provided which is removably hinged to the outside of the box and formed integrally therewith from the same sheet of stock. The opening of the information flap is controlled by a tongue which is inserted through a slot in the box walls joining the side walls and front or rear wall, the sliding friction of which controls the flap opening feature. The flap and box are formed of the single unitary sheet of material having generally rectangular form, cut and shaped for a minimum of waste, and crimped, scored or otherwise creased with lines to facilitate folding and assembly. The box construction is adapted for machine manufacture and forming.

8 Claims, 17 Drawing Figures

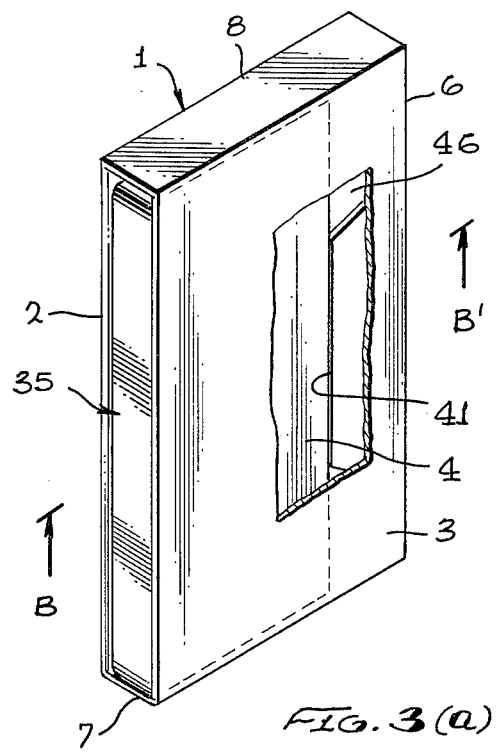
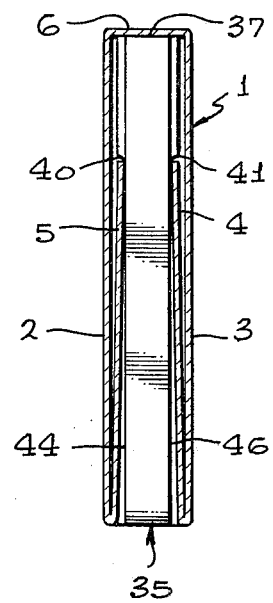
FIG. 3(a)
FIG. 3(b)
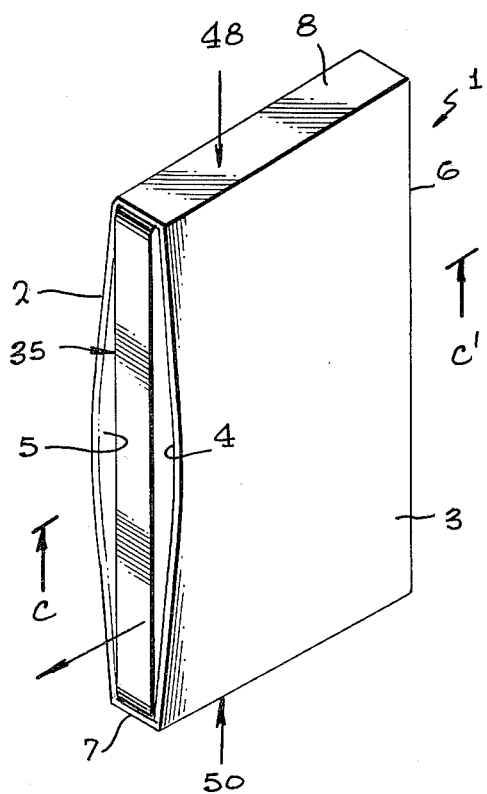
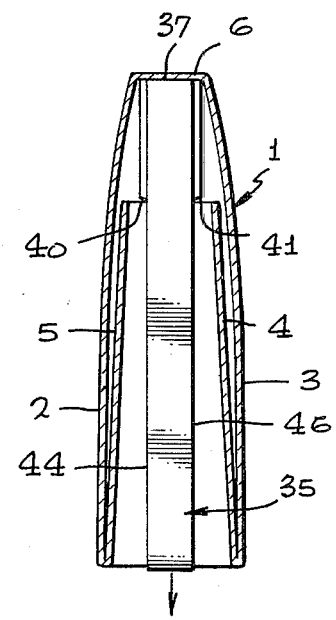
FIG. 4(a)
FIG. 4(b)

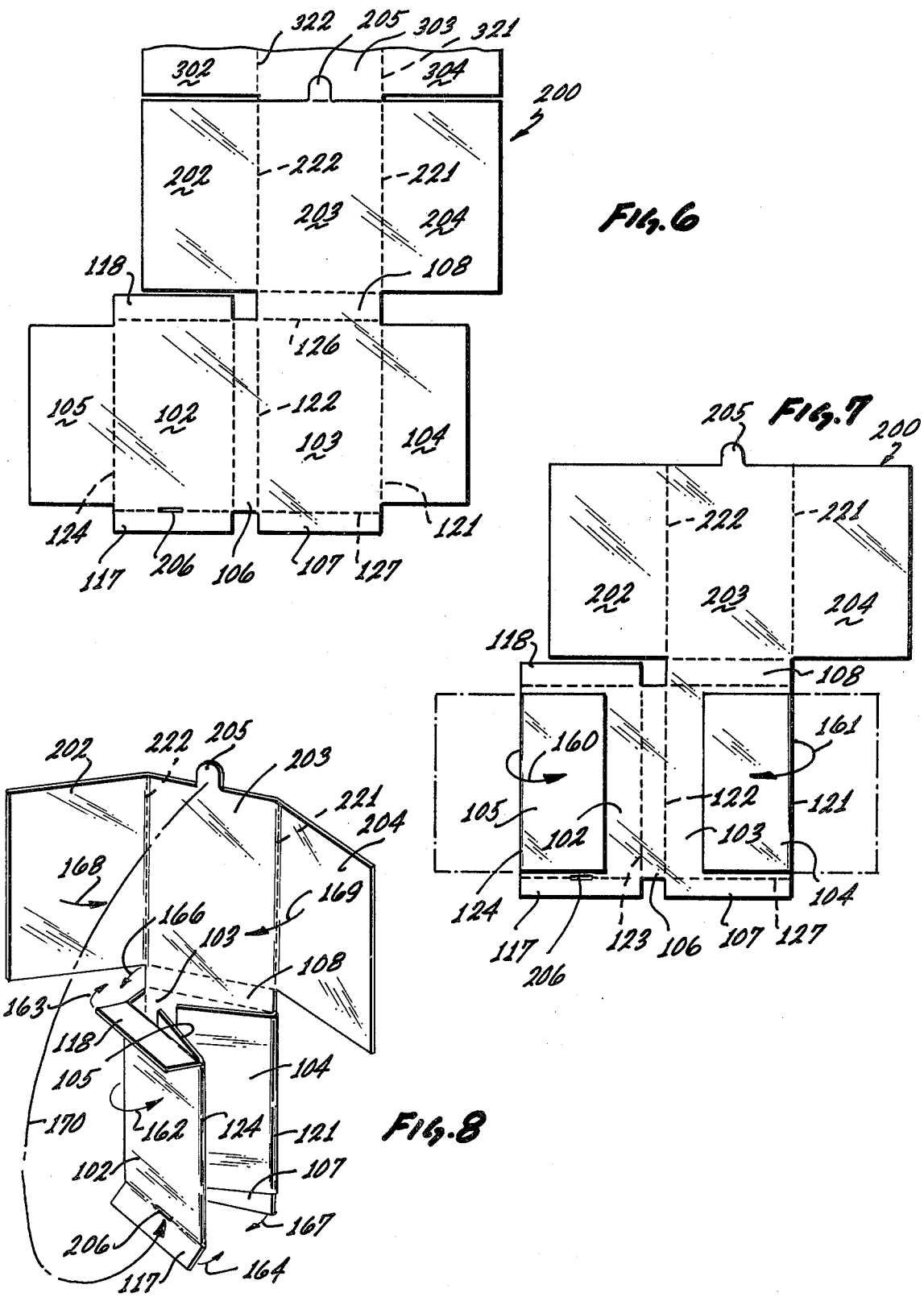

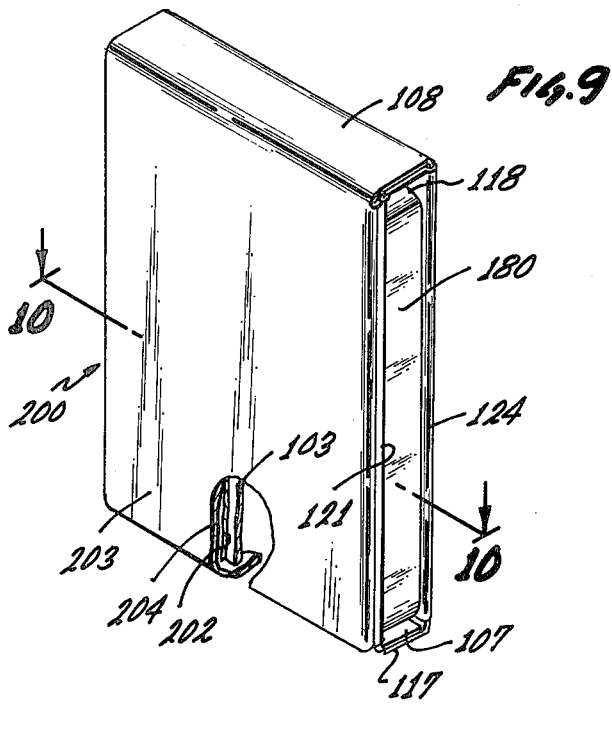
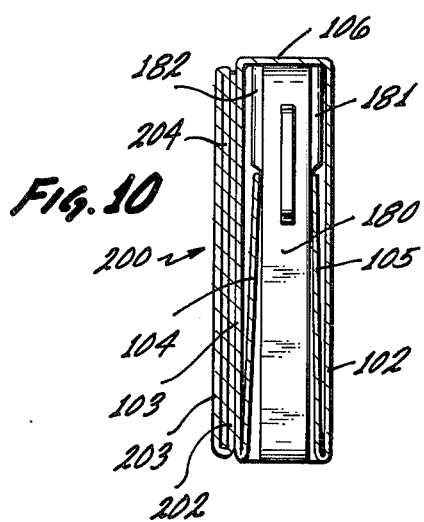
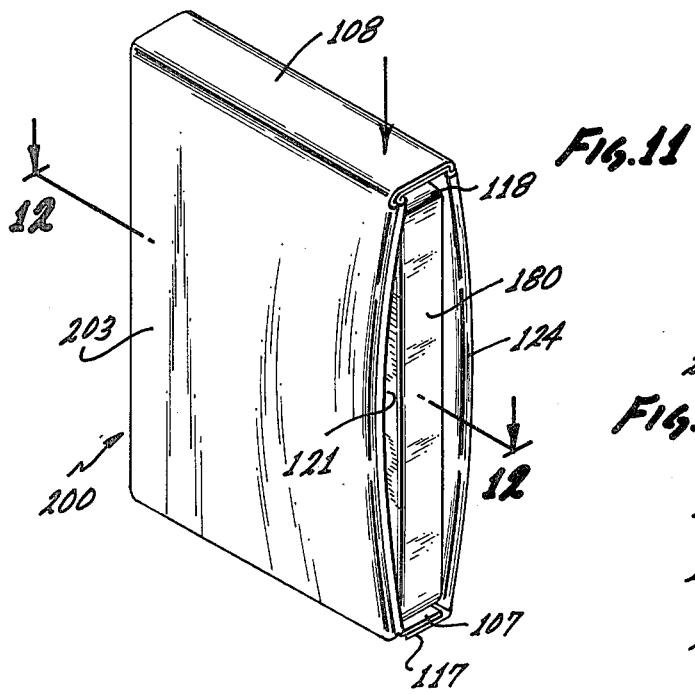
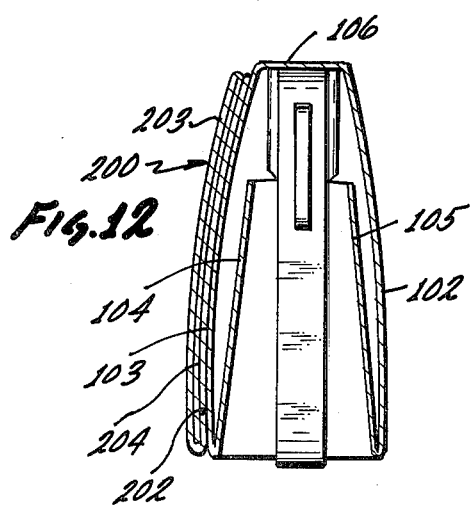

SELF-LOCKING BOX FOR TAPE CASSETTES AND INFORMATION FLAP

CROSS-REFERENCE TO RELATED APPLICATION

This application is a continuation-in-part of my prior U.S. Application, Ser. No. 168,763 filed July 11, 1980, now abandoned and entitled SELF-LOCKING CASSETTE TAPE BOX.

BACKGROUND OF THE INVENTION

The present invention relates to reusable boxes for packaging and containing cassette tape cartridges and particularly to a self-locking cassette box of the squeeze releasable type.

Available boxes for cassette tapes have been provided with a releasably openable feature. However, the desirability of providing means to securely retain the cassette tape in the cassette tape box has usually made it necessary to provide specific structure hinged to the box for this purpose. The cited requirement has resulted in prior art cassette tape boxes which are expensive to manufacture and cumbersome to use.

U.S. Pat. No. 3,912,077 discloses a cassette box having a locking cover which releasably unlatches by squeezing the front and back walls of the box. The tape cassette is pushed out of this box by springs attached to a bottom wall. The need to have a hinged cover to lock the cassette tape in however significantly adds to the complexity of the structure and requires that it made of non-flexing members interconnected by devices of specific functions such as hinges and springs. Squeezing is also used to remove a locking cover in U.S. Pat. No. 3,532,211 but is only achieved by using a complex structure.

The concept of locking a cassette tape in a cassette tape box by engaging a discontinuity on the cassette tape cartridge such as shoulder opening or projection appears to be used in U.S. Pat. Nos. 3,644,492; 3,994,551; 3,995,921; 3,909,088; 3,754,639; and 3,272,325. In each of these prior art boxes however, substantial additional structure distinct from the structure of the box itself is required for perform the locking function. Moreover, dexterity is required to release the locking mechanism in these prior art structures.

SUMMARY OF THE INVENTION AND OBJECTS

It is a general object of the present invention to provide a cassette tape cartridge packaging box which overcomes the foregoing limitations and disadvantages of the prior art.

Another general object of the present invention is to provide a box for releasably packaging standard tape cassettes for point of sale use, and the releasable locking feature of which is reusable indefinitely by the user, the box being of solely of folded cardboard sheet construction. As used herein "cardboard" shall include both paper, fiber, sheet as well as stiff cloth or plastic.

It is a further an object of the present invention to provide a cassette tape box which can lock a cassette tape therein by abuttingly engaging a discontinuity such as a shoulder provided present on the tape cassette or cartridge.

It is also an object of the present invention to provide a tape cassette box which will release the cartridge from locking engagement therein when its sides are squeezed together.

It is also an object of the present invention to provide a tape cassette box which is inexpensive to manufacture.

It is also an object of the present invention to provide a tape cassette box which is easy to assemble.

It is also an object of the present invention to provide a tape cassette box which is easy to use.

It is also an object of the present invention to provide a tape cassette box which is light in weight.

It is also an object of the present invention to provide a tape cassette box which has a simple structure.

It is also an object of the present invention to provide a tape cassette box which can easily accommodate printed material thereon.

In accordance with the present invention, a self-locking tape cassette box is provided for releasably locking therein a cassette tape having a discontinuity or ridge thereon. Locking flap means is hingedly connected to depend from the front and rear walls and into the box and extends to a depth sufficient to engage the discontinuity on the cassette cartridge when the same is inserted fully into the box. The flap means extend laterally inside the box to the edges to provide release means for disengaging the same from the discontinuity as the box is squeezed. The flap means are wide enough that when the box is squeezed the flaps and the front and back walls are placed in compression and will collapse in a manner similar to a buckling column as the box is squeezed. However, unlike usual column failure, the box walls do not fail but recover elastically. The flaps flip to an unstable, temporary position adjacent to the box walls and away from the cassette to free the same. This gives an over center feel to the user, simulating the feel of a complicated mechanism being satisfactorily opened. The dimension of the box is slightly larger than the cassette cartridge which it contains so that there is sufficient room available for the squeezing action to take place. However, this room or space is only large enough to permit the deformation of the box walls within a recoverable range so that the box is reusable.

Thus, with a simple folded cardboard structure it is possible to create a box having a reusable flap moving feature for interlocking the cartridge which feature operates something in the nature of a toggle shifting between a first stable position in which the box walls are straight, the flaps extending into the box and being urged by their connection with the front and back walls towards each other to capture the cartridge. The second position is unstable and, the box acting like a spring desiring to return to a straight position from a bent position. The interior flaps are dimensioned to be somewhat less in length than the extent of the walls to which they are joined so that they are free to move towards and away from the cassette cartridge as the box is closed; however, they are long enough that they are contacted by the inner side walls of the box in the squeezing motion and before the cartridge is abutted.

A further improvement in the structure of the box includes an exterior information flap which can be folded and collapsed into continuity with the other wall of the box. This flap is conveniently provided within a generally rectangular area of a cutout blank and does not have any overlapping or glue lines but consists merely of additional folded portions. Furthermore, the information bearing flap is openably attached to the box with a tongue designed to frictionally secure the information flap to the box while the box is sprung open to release the cassette. The friction between the tongue and the box may be varied in the design to provide for easier or more difficult opening of the information flap.

BRIEF DESCRIPTION OF THE DRAWINGS

FIG. 3(b) illustrates a cross-sectional view of FIG. 3(a) taken along the line B—B'.

FIG. 4(a) illustrates the assembled embodiment of FIG. 1 being squeezed to permit removal of the cassette tape contained therein.

FIG. 4(b) illustrates a cross-sectional view of FIG. 4(a) taken along the line C—C'.

FIGS. 6 through 12 illustrate the manufacture and construction of a second preferred embodiment of the present invention featuring an extended information flap releasably openable to the box, FIG. 6 being a plan view of a blank cut and scored for manufacture.

FIG. 7 shows a first flap folding step in the formation of the box of FIGS. 6 through 12.

FIG. 8 shows the remaining folding steps in forming the box of FIGS. 6 through 12.

FIG. 9 shows an assembled box in accordance with the FIGS. 6 through 12 with a portion cut away to illustrate the engagement of the flap tongue with the same.

FIG. 10 is a cross sectional view taken along the lines 10—10 of FIG. 9.

FIG. 11 is a perspective view of the box of FIGS. 6 through 12 showing column collapse of the front and rear walls when squeezed in the direction indicated by the arrows.

FIG. 12 is a cross sectional view taken along the lines 12—12 of FIG. 11.

DETAILED DESCRIPTION OF THE PREFERRED EMBODIMENTS

Figure 1:
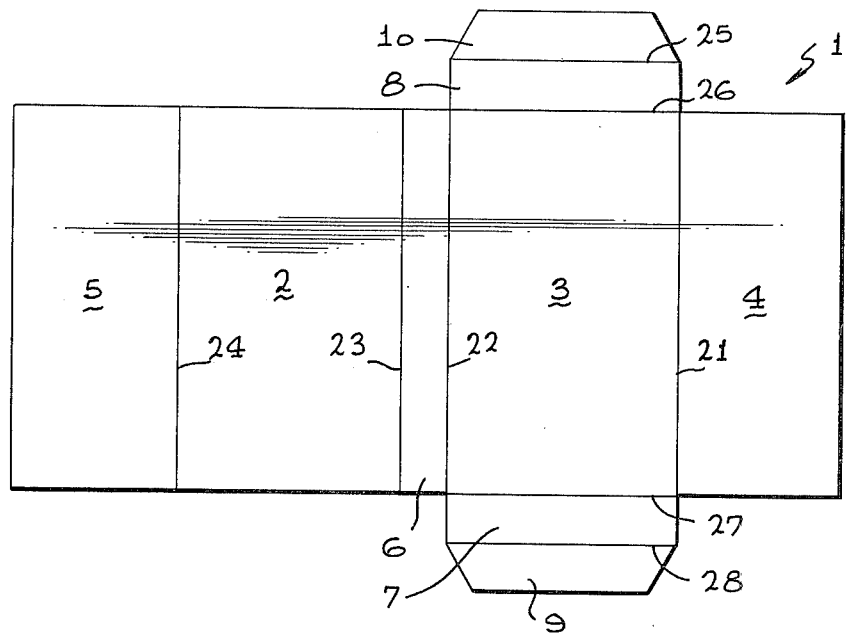
FIG. 1 illustrates a cardboard blank cut to shape together with indicated fold lines for folding and forming a first preferred embodiment of the present invention.

The outer perimeter of FIG. 1 illustrates the general shape of the material used to construct the preferred embodiment of the present invention. The lines within this outer perimeter, i.e., lines 21-28, are the edges along which this material is folded to achieve the shape of the preferred embodiment of the present invention. When so folded, as discussed below in detail, the following surfaces become identifiable: face panels 2 and 3; locking panels 4 and 5; back panel 6; side panels 7 and 8; and side panel closure tabs 9 and 10.

Figure 5A:
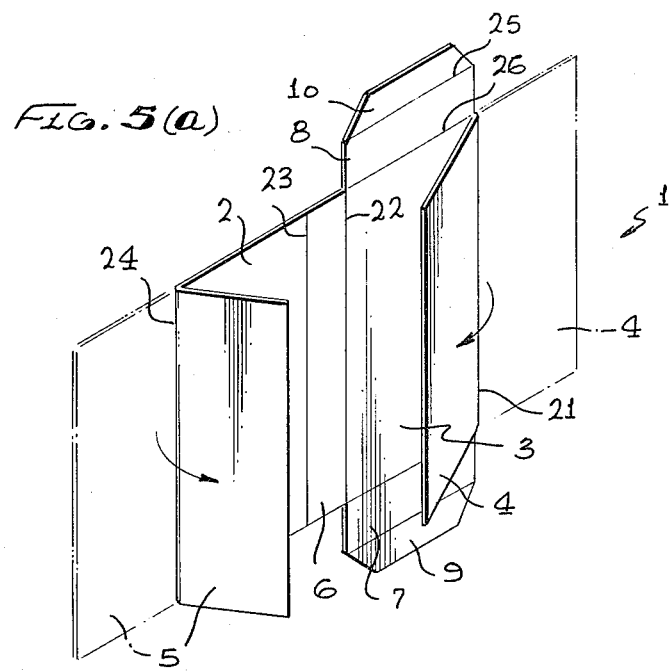
FIGS. 5(a)-5(c) illustrate the sequential steps in folding the material shown in FIG. 1 into the preferred embodiment of the present invention.
Figure 5B:
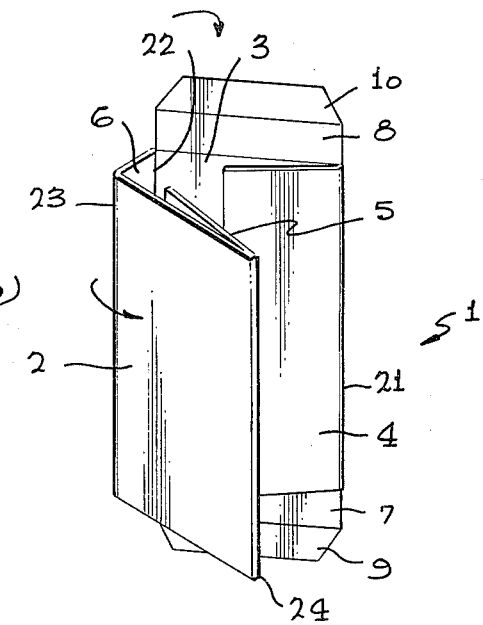
Figure 5C:
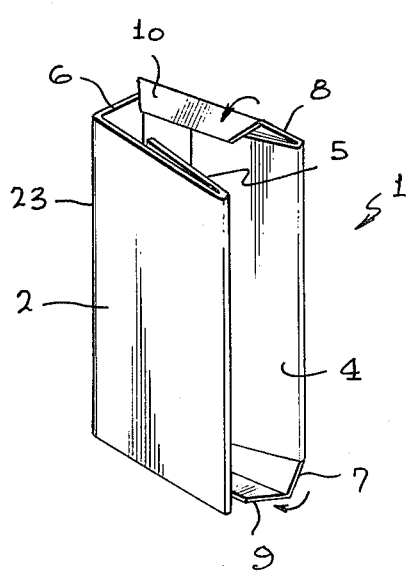

To construct cassette tape box 1 from this material, the panels should be temporarily folded inwardly along lines 21-28 to embed creases in the material. Then, locking panel 4 is folded inwardly on top of face panel 3 along line 21 and locking panel 5 is folded inwardly along line 24 on top of face panel 2 as shown in FIG. 5(a); back panel 6 is then created by folding face panel 2 and locking panel 5 90 degrees inwardly along folding edge 23 and by folding face panel 3 and locking panel 4 90 degrees inwardly along line 22 as shown in FIG. 5(b). Side panel closure tabs 9 and 10 are then inserted in the slotted spaces between locking panel 5 and face panel 2 as shown in FIG. 5(c). Fastening means such as glue placed on the surfaces of side panel closure tabs 9 and 10 which contact face panel 2 should be used to insure retention of cassette tape box 1 in its folded state.

The dimensions of the material used to construct cassette tape box 1 are keyed to the dimensions of the standard cassette tape. Thus, the width of face panels 2 and 3 should be approximately equal to the width of the cassette tape, and the width of back panel 6 and side panels 7 and 8 approximately equal to the thickness of the thickest part of the cassette tape.

The width of locking panels 4 and 5 is somewhat shorter than the width of face panels 2 and 3. In particular, the width of these locking panels should be approximately equal to the distance between the back of a standard cassette tape and the point towards the front at which the thickness of the cassette tape begins to increase due to the hereinafter described discontinuity thereon. The reason for this measurement selection, as will be more fully described below, is to permit cassette box 1 to lock the cassette tape once inserted therein.

Finally, the length of face panels 2 and 3, locking panels 4 and 5, and back panel 6 is approximately ⅛" more than the length of a standard cassette tape. The reason for this length selection, as will be more fully described below, is to permit cassette tape box 1 to release the locking mechanism from abutting engagement with the discontinuity on the cassette tape.

The material used to construct cassette tape box 1 should be sufficiently strong to insure that its shape after being folded is not easily distorted. At the same time it should be sufficiently pliable to permit folding and flexing. The thickness of this material should not exceed, although it should preferably approach, the thickness of the hereinafter described discontinuity on the face of the cassette tape. Although it is believed that there are a variety of materials suitable for this purpose, a quality grade of cardboard has been found to be a particularly suitable choice.

Cassette tape box 1 is designed to releasably lock a standard cassette tape therein. For this purpose, it is essential that the cassette tape have a discontinuity thereon. While it is contemplated that many points on the cassette tape, such as its hub wheels for example, can be used as the needed discontinuity with slight obvious modifications of the preferred embodiment (discussed below), it is preferred that the outwardly protruding planer surfaces 40 and 41 (see FIG. 2) located on the faces of the cassette tape between its front and back panels and parallel thereto be used for this purpose.

Figure 2A:
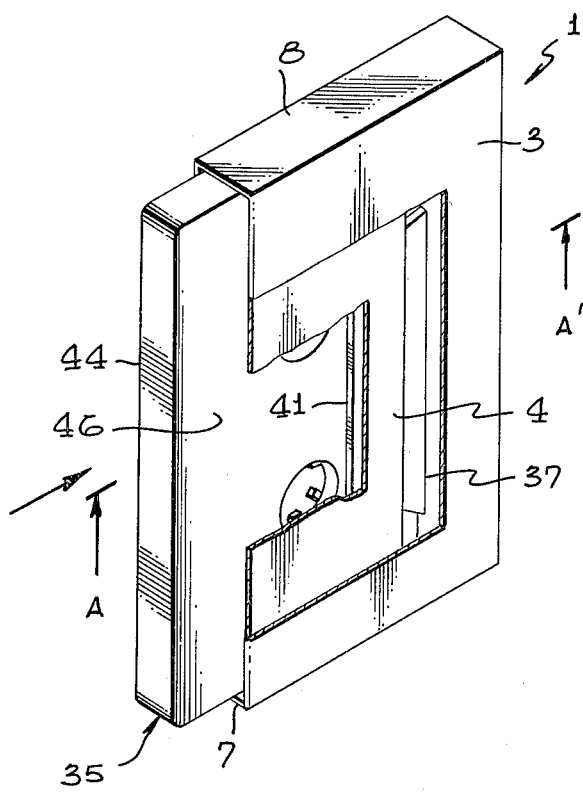
FIG. 2(a) is a perspective view partially cut away of a box constructed in accordance with the present invention from the blank of FIG. 1 and shows a cassette tape partially inserted therein.
Figure 2B:
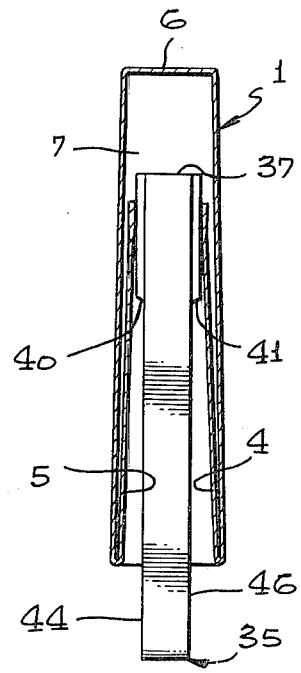
FIG. 2(b) illustrates a cross-sectional view of FIG. 2A taken along the lines A—A' thereof when the cassette is partially inserted.

FIGS. 2, 3 and 4 illustrate the operation of the preferred embodiment of the subject invention.

In FIG. 2, cassette tape 35 is shown partially inserted in cassette tape box 1. As cassette tape 35 is inserted into cassette tape box 1, as shown in FIG. 2, the forward portion 37 of cassette tape 35 pushes apart locking panels 4 and 5.

As the insertion of cassette tape 35 in cassette tape box 1 continues, there comes a point, as illustrated in FIG. 3, when outwardly protruding surfaces 40 and 41 pass by the innermost edges of locking panels 4 and 5. At this point, the outwardly pushing force described above is removed thus allowing locking panels 4 and 5 to move inwardly until they abut faces 44 and 46 of cassette tape 35. Once this happens, cassette tape 35 cannot easily be removed from cassette tape box 1 because of the abutting engagement of the innermost edges of locking panels 4 and 5 with protruding surfaces 40 and 41, respectively.

To permit removal of cassette tape 35 from cassette tape box 1, as shown in FIG. 4, the center portions 48 and 50 of side panels 8 and 7 respectively are pressed inwardly toward one another. This causes outward buldging of face panels 2 and 3 and of locking panels 5 and 4. As locking panels 4 and 5 buldge outwardly, their innermost edges are withdrawn respectively from abutting engagement with protruding portions 40 and 41 of cassette tape 35. As a consequence, cassette tape 35 may then be easily removed from cassette tape box 1.

Once removed and once pressure is released from the center portions 48 and 50 of side panels 8 and 7, respectively, cassette tape box 1 will return to its original shape. Thus, cassette tape box 1 will then be ready to securely retain cassette tape 35 when it is again inserted.

The locking flaps and the side walls or panels of the box are dimensioned to have certain tolerances. Firstly, it will be noted that the cassette cartridge and box must be dimensioned so that the inside is end-to-end spaced slightly from the cartridge so that the motion illustrated in FIG. 3(a) and FIG. 4(a) can take place. In addition, the flaps should extend end-to-end in the box a distance slightly less than the end-to-end interior dimension so that the flaps are free to move towards and away from the cassette under the influence of the residual springiness of their interconnection with the front and back walls. Obviously, the flaps must extend beyond the length of the cassette so that when the box is collapsed the end walls of the box will contact the flaps and cause them to flex together with the front and rear walls. This amount of space can indeed be made quite small, since the actual movement of the front and rear walls in column collapse to cause opening of the box is only a small fraction of an inch. This collapsing feature is illustrating in the drawings of FIGS. 4(a) and 4(b). It is found that the flaps extend in a generally "V" configuration in cross-section to the side walls and together form a good retaining feature when the box is not compressed. However, as the box end walls are squeezed, the flaps flip from an inward orientation to an outward orientation so as to be able to be formed. This creates the feel of an over-center toggle which is unstable at one limit of travel; namely, the open position, and tends to return like a spring to its relaxed position when the walls are straight. Thus, the operation in fact may be described by a sequence of events beginning with resistance of the front and rear walls alone to the squeezing action which then begins to bear upon the flaps causing a considerable resistance to further squeezing after which the flaps jump or flop to a position immediately contiguous to the front and rear walls. At this point, column flexing of the front and rear walls together with the flaps can only take place outwardly since the cassette itself biases the flaps and walls toward outward motion and prevents inward movement. This occurs within a very small range of substantial squeezing of the box after which the cassette cartridge shell itself is contacted to stop further movement and irrecoverable collapse. The available space is such that no substantial permanent deformation of the box occurs within the limits of travel just defined so that after the cassette cartridge is removed the box will spring back to its normal relaxed state and the interior flaps flop back to a central orientation. The amount of clearance required between the interior of the finished box and the cassette cartridge can be very small indeed, and can nearly be provided by the compliance of the roundness of the cassette side edges, and by providing adequate clearances in the manufacturing tolerances.

When constructed in the manner shown, the locking flap has several mechanical features which should be emphasized.

It has sufficient dimension and structure in the direction extending downwardly into the box so as to be able to resist compression forces and end-to-end developed by squeezing the end walls of the box toward each other in a manner similar to a column structure, rather than by simple piecemeal internal crushing. In addition, the flap is pushed into a position making only a small angle to the associated box wall. The flap clears the end walls when the box is not squeezed so that the flap bears against the cassette in the region of the discontinuity when in a relaxed state.

When squeezing action is applied both the flap and wall must move together and are restrained such that the center top only can move in and out. In the specific construction shown, the inside edge of the flap cannot move in because the discontinuity prevents it. Likewise the top cannot move inward because of the presence of the cassette. It is also believed that there is a propensity for the flap and the associated wall to bow and flex together in a single bowed curve (being constrained to go out by bottom edge, top edge and cassette.) In any event, after the first toggle opening, the box, the front and back covers, the flaps are thereafter biased toward opening outwardly.

While the free edge of the flap need not be straight from end wall to end wall it is simple and effective to make it so as shown. Also, it makes the position of where the user squeezed the box less critical.

If analyzed as a column in compression failure, the flap and wall make a joined two plate structure having unpredictable, but probable, S-shaped failure mode. This converts rapidly to a single bowing in the direction of allowed motion, namely outwardly.

It is contemplated that promotional material will be printed on the outer surfaces of cassette tape box 1. Because cassette tape box 1 can be formed entirely from a single flat piece of material, such promotional material can be directly printed on the material very easily prior to folding of the material.

It is also contemplated that the cassette tape box containing a cassette tape will be wraped in clear material such cellophane during the marketing stages of the product's use. A strip of material can be inserted in the cassette tape hubs in a well known manner so as to prevent accidental rotation of the hubs during transit.

It is also not essential that the abovedescribed protruding surfaces (40 and 41) be used as the surfaces which abut the locking panels. For example, by redesigning the locking panels in an obvious manner to have inwardly protruding tabs at the point where the cassette tape hubs reside when the cassette tape is fully inserted, the cassette tape hubs can function as the discontinuity which is abuttingly engaged by the locking panels. In this instance, the same squeeze-operated release means will operate to disengage the locking panels from abutting engagement with the cassette tape hubs. Also, it is possible to use just one locking panel, although two are preferred.

Referring now to FIGS. 6-12, there is shown a second preferred embodiment of cassette box constructed in accordance with the present invention and incorporates an extended information flap integrally formed with attached to and folded into a compact form in association with the box. Wherever possible, like parts have been given like numbers and the embodiment of FIGS. 1 through 5 the reference numbers being raised by the addition of one hundred. Where the reference numbers refer to parts of like description and function the same need not be repeated, but will be assumed from the preceding description.

In general, this embodiment features an added information sheet 200 which is integrally formed with the box and presents opposite faces for receiving large scale graphics suitable for explaining the box contents, the performers and the performances recorded thereon. Also the box illustrates further details of variations in the construction of the invention which have been found quite suitable. Thus, the ends of the box are closed in somewhat different manner, being provided with additional flaps 117, 118 which overlap by ends 107, 108. The information receiving structure 200 is indicated by the flap extension 201 to which panels 202 and 203 are integrally formed. If necessary to obtain additional information, a further extension of panel 200 may be given and is shown in broken form as integrally formed therewith and adjoined solely at the center section 201. The upper end of section 203 is punched to form a tongue, 205, which is used to secure the information flap to the box when all is folded up. For ease of illustration portions of the box 302, 303, and 304 are only indicated in phantom lines in FIG. 6 and are omitted in FIG. 7 and following so as to avoid confusion. However, it will be obvious from simple considerations that 302 and 304 may be folded inwardly so as to overlie that side of flap 303 which is then brought downward into overlapping relationship on the front side of flap 203 after which the other flaps may be folded. The amount of material which can be permanently incorporated into the box by this means is rather considerable. Referring to FIG. 6 and considering only the flaps 202, 203, 204, fold lines 221 and 222 are provided whereby the information flap may be folded so that flaps 202 and 204 will lie between the overcarried flaps 203 when the same is folded onto the box.

FIG. 7 shows the beginning of the folding operations in which flap 105 and flap 104, the locking flaps are brought in the direction of the arrows 160 and 161 into overlapping relationship with front and back walls of the box on the side which will become the inside. Thereafter as shown in FIG. 8 the box is folded by bringing the parts together along arrow 162 and thereafter folding the top and bottom or rather the sides of the box along arrows 163 and 164. The closing sides 107 and 108 are then brought over the top of flaps 117, 118 and secured thereto as by gluing, the motion being as indicated by arrows 166 and 167. At this point the information flap is free and may then be folded along arrows 168, 169 into a compact form after which the entire information flap is brought along arrow 170 down over the front or rear wall of the box and is inserted into the tongue slot 171.

The assembled box shown completely in FIGS. 9 and 10 together with a cassette cartridge 180 disposed therein and as can be clearly seen the entire assembly is neat and compact. When the cassette is inserted its standard projections 181, 182 are sufficiently into the box that the flaps 104, 105 fall toward the cassette in such a way as to lock the same in place. This is particularly shown in FIG. 10. FIG. 11 and FIG. 12 are similar to FIG. 10, but to show the nature of the operation of the box when the same is squeezed on its ends. Thus, the material of the walls has no place to go but to cop outward and thus carries with it the interior flap as previously described. The cross-sectional view in FIG. 12 shows that the interior flap, having the dimensions somewhat less than the extent between the end walls so as to provide initial clearance for movement of the flaps does not lie completely contiguous to the outer walls in the center region as indeed it cannot since it is of a different length. However, the difference is only such that it assumes a somewhat intermediate position in the middle, where the section lines are taken, as distinct from the completely withdrawn position it assumes at its ends and limited by the box interior dimensions at that point. As shown the cassette is free to fall from the box when the same is squeezed. The explanation precedes as given heretofore of this aspect of the operation. In addition, the friction provided between the tongue 205 and the tongue slot 206 is sufficient even under ordinary circumstances that the information flap does not pop off the box when the same is opened but rather is desirably maintains its position to the box until lifted off deliberately by the user.

I claim:

1. A reusable box for releasably holding an article such as a standard cassette cartridge of the type having engageable ridge means facing outwardly from its exterior walls comprising front and rear walls connected by a bottom and side walls and having an open top forming a slot by which said article may be inserted into said box in such an orientation that said ridge faces out toward said slot, said front and rear walls and said side walls being continuous about the top of said box with their upper edges terminating in a common plane, at least one locking flap wall connected from the top of one of the front and back walls and depending downwardly therefrom into the box, said flap wall being formed and joined integrally with the front or rear wall to which it is associated and being creased thereto to lie within said box so as to naturally and freely move toward the other of said front or rear walls by a pivoting motion about the crease, said flap wall including having a dimension to the edge away from the crease so as to engage said ridge of said cartridge, said flap further extending laterally from side wall to side wall and lying within said box, and having sufficient width and structure to resist end-to-end compression as a unitary column structure by being pivotally supported on the one side by being joined to said front or rear wall, so that squeezing on the side walls of the box along the upper top half thereof by the user causes a compression to develop in both the front and rear walls and on the flap wall, the flap and associated front or rear wall flexing and buckling outwardly in response to squeezing, causing the flap to close up to the wall so that the flap and associated wall move outwardly away upon such squeezing after which the cartridge is freely slideable out of the box, the latter, after release, returning to its original shape for reuse and the flap returning to a relaxed state at a ridge engaging angle with the wall, so that when said cassette is reinserted, it is reengaged by the flap.

2. The box as in claim 1 wherein said box is made up of a single blank material in which continuous means joins said flap and said one wall, said bottom wall and said other of said front and rear walls.

3. A box as in claim 1 in which said flap means comprises two flaps respectively formed integrally with and depending downwardly from the top of the front and rear walls of said box, each of said flaps moving outwardly with the associated front or rear wall when the box yields in compression on squeezing to thereby cooperatively release the cassette cartridge for movement from the box.

4. The apparatus of claim 1 wherein said material is paperboard.

5. The apparatus of claim 1 wherein the ridge comprises a raised planar surface protruding from a face of the cassette tape and wherein the locking means comprises an elongated planar panel.

6. A cassette box as in claim 1 wherein walls of said box, said flaps, and all the parts thereof are constructed from a single sheet of blank stock suitably cut and scored along the fold lines thereof.

7. A cassette box as in claim 6 further including an information bearing flap integrally attached and hingedly connected at one end to a side wall of the box and having a free edge positioned away therefrom so as to hinge and open from the box independently of the squeezing action used to open same.

8. The cassette box as in claim 7 wherein a plurality of flap means are attached to said information bearing flaps and are constructed and adapted to fold an overlapping relation and downwardly against the inside face thereof for being folded therewith out of the way and onto the box, tongue means extending beyond the information flap from a free edge thereof and adapt to be inserted into a slot formed in the box structure and between the side and rear or front wall thereof.

* * * * *